United States Patent [19]

Datta et al.

[11] 4,330,583
[45] May 18, 1982

[54] HIGH DENSITY INFORMATION RECORD LUBRICANTS

[75] Inventors: Pabitra Datta, Cranbury; Eugene S. Poliniak, Willingboro, both of N.J.

[73] Assignee: RCA Corporation, New York, N.Y.

[21] Appl. No.: 231,857

[22] Filed: Feb. 5, 1981

[51] Int. Cl.$^3$ .............................................. B32B 3/02
[52] U.S. Cl. ...................................... 428/65; 428/447; 428/451; 428/900; 252/49.6
[58] Field of Search ................... 428/64, 65, 900, 447, 428/451, 323; 346/137; 252/27, 28, 49.6

[56] References Cited

U.S. PATENT DOCUMENTS 3,833,408 9/1974 Matthies .............................. 428/447

Primary Examiner—Marion McCamish
Assistant Examiner—Beverly K. Johnson
Attorney, Agent, or Firm—Birgit E. Morris

[57] ABSTRACT

High density information records comprising a conductive carbon-loaded polyvinylchloride record are lubricated with a fractionated methylalkylsiloxane lubricant which contains an hydroxylated amine and or its quaternary salt in an amount sufficient to reduce sensitivity of the records to moisture.

5 Claims, No Drawings

HIGH DENSITY INFORMATION RECORD LUBRICANTS

This invention relates to improved high density information records. More particularly, this invention relates to lubricated high density information records wherein the lubricant contains a hydroxylated amino dopant.

BACKGROUND OF THE INVENTION

Clemens, in U.S. Pat. No. 3,842,194, has disclosed a system for recording and playback of information, including audio, video and color information, capacitively. The high density information record has signal information in the form of a surface relief pattern in an information track, e.g., a spiral groove, on the surface of the record. The record is made conductive with a metal layer, which acts as the first electrode of a capacitor, and then with a dielectric layer. The record is played back by means of a stylus electrode which is the second electrode of the capacitor. Since the record is rotated at a fairly high speed, on the order of 450 rpm, the friction between the stylus and the record surface may result in undue stylus wear. Thus a lubricant is applied to the surface of the record.

A suitable class of lubricants has been described by Matthies in U.S. Pat. No. 3,833,408, herein incorporated by reference. These lubricants have the generic formula

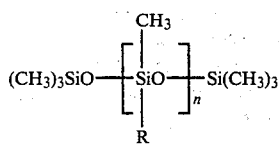

wherein R is an alkyl group of 4 to 20 carbon atoms and n is an integer.

Various improvements have been made to the record of Clemens including a record made from a conductive plastic which avoids the need for applying separate conductive metal and dielectric layers. Such a record may contain conductive particles for example. Improvement has also been made to the lubricant system. It has been found that when the lubricant is purified and fractionated, improved playback and storage stability results. The fractionated lubricant has the formula

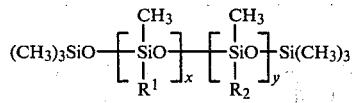

wherein $R_1$ and $R_2$ are alkyl groups of 4–20 carbon atoms, x is an integer of 2–4 and y is an integer of 0–2 and wherein the sum of x and y is 4 or less. The improved lubricant has better long term stability and improved first play performance and it is described in a patent by Wang et al., U. S. Pat. No. 4,275,101, and also herein incorporated by reference.

Some problems still remain for the lubricated, conductive record. The record surface has been found to be sensitive to moisture; that is, when the record is exposed to ambient conditions over a period of time, particularly including conditions of high relative humidity, a thin layer of organic and inorganic water soluble salt deposits form on the surface of the record, lifting the stylus during playback and interrupting the signal. This loss of signal has been termed "carrier distress". This carrier distress has been alleviated somewhat by careful cleaning and drying of the record surface which removes water soluble materials that have formed on the surface during molding operations. However, with time, additional water soluble materials and external debris form on the surface of the record, particularly in the presence of water vapor. Thus a method of improving the long term stability of the disc surface to moisture has continued to be sought.

SUMMARY OF THE INVENTION

We have found that doping the lubricant for high density information records with an hydroxylated amine improves the long term stability of the records, particularly to moisture, and reduces carrier distress.

DETAILED DESCRIPTION OF THE INVENTION

The hydroxylated amines suitable for use in the invention have the formula

wherein $R_3$ is hydrogen, lower alkyl or hydroxyalkyl; $R_4$ is $R_6A$ wherein $R_6$ is an alkyl group of 1–5 carbon atoms and A is hydroxyl or carboxyl; $R_5$ can be $R_7A$ wherein $R_7$ is a straight chain alkyl group of 1–10 carbon atoms and A has the meaning given above, or, can be $R_7A-B-R_8$ wherein $R_7$ and A have the meanings given above, B is a linking group which can be —O— or —C═C— and $R_8$ is an alkyl group of from about 6–25 carbon atoms. The hydroxylated amines can also be in the form of their corresponding quaternary salt, as for example

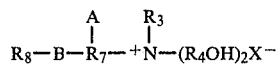

wherein $X^-$ can be a halogen, —$CH_3SO_4$ and the like. Mixtures of an amine and its quaternary salt can also be employed.

The hydroxylated amine additive can be dissolved in a solvent and applied to the surface of the record either as a separate step or mixed with a solution of the lubricant and applied together, providing the solutions are miscible with each other. The exact amount of hydroxylated amine to be added to the surface of the record is not critical, but a sufficient amount to reduce the water sensitivity of the conductive record should be employed. In general, at least about 5 percent of the hydroxylated amine, based on the weight of the lubricant in the solution, should be employed. Preferably from about 10 to about 40 percent by weight of the lubricant of the hydroxylated amine will be effective.

The details of the mechanism for the improved playback performance of high density information records lubricated with a lubricant containing the present additive system is unknown; whether the additive, which has a polar end group, e.g., hydroxy or amine end group, reacts with free radicals on the surface of the record which reduces reactions due to oxidation reactions with metal ions and the like which can form salts or debris on the surface of the record, or whether by way of improved boundary lubrication which prevents water soluble materials and dust particles and the like from adhering to the surface of the record, is not understood. However, the addition of the present hydroxylated amine to the basic lubricant system for the record does improve the ability of the lubricant system to lubricate the record surface, improve the long term stability of the surface of the record and reduce carrier distress.

The lubricant system of the present invention can be applied to conductive high density information records as they are pressed from the mold, or the conductive records can be cleaned first with an aqueous rinse. The cleaning solution presently preferred is a 5 percent aqueous solution of a mixture containing 96.2 mol percent of an alcohol having the formula

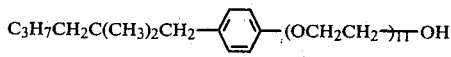

about 3.8 mol percent of 1,2-propanediol and a minor amount of triisopropanolamine. The cleaned records may be dried with a solvent such as 1,1,2-trifluoro-2,2,1-trichloroethane.

The invention will be further illustrated by the following Examples, but the invention is not meant to be limited to the details described therein. In the Examples parts and percentages are by weight unless otherwise noted.

Carrier distress time is measured by adding the amount of time in seconds (but discounting intervals of less than 10 microseconds) during record playback when the r.f. output of the player arm is less than 150 millivolts peak to peak and the time when r.f. output gives about 8.6 megahertz or below 3.1 megahertz in frequency, indicating a defect. Such defects are noted by the viewer as dropouts. The present acceptable level of carrier distress for a video record is 3 seconds in 1 hour of playback time.

EXAMPLE 1

A molding composition was prepared by mixing 78 parts of Geon 110×346 polyvinyl chloride of the B. F. Goodrich Company; 13 parts of Ketjenblack EC carbon black of the Armak Company; 1.5 part of the dibutyltin-β-mercaptopropionate commercially available as T-35 from M & T Chemical Company, Inc.; 1.0 part of Mark 275 stabilizer of the Argus Chemical Company; a dibutyltin maleate stabilizer; 2.0 parts of Acryloid K-147 and 0.75 part of Acryloid K-275, acrylic modifiers of Rohm & Haas Company; 0.5 part of Loxiol G-30 and 0.25 part of Loxiol G-70 lubricants of Henkel International GmbH; 1.0 parts of calcium stearate and 3.0 parts of diundecyl phthalate.

Video records were compression molded from the above composition at about 360° F. (182.2° C.). The records, as molded were then sprayed with a heptane solution containing 0.15 percent of methyldecylsiloxane molecularly distilled at 205° C. and 5 percent by weight of the methyldecylsiloxane of a compound of the formula

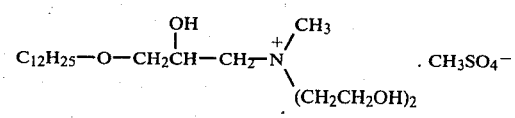

commercially avaiable as Cyastat-609 of the American Cyanamid Company.

Six records were played back while measuring carrier distress. On initial play all of the records passed the 3 second maximum carrier distress criteria.

The records were then stressed by storing for 48 hours in a chamber maintained at 100° F. and 95 percent relative humidity. Forty (40) percent of the records had 3 seconds or less of carrier distress, 10 percent had 20 seconds or less of carrier distress and 40 percent had over 20 seconds of carrier distress based on 1 hour of play. After stressing the second time, 60 percent of the records had 3 seconds or less of carrier distress, 10 percent had 20 seconds or less and 20 percent had over 20 seconds of carrier distress.

These records were compared with the second group of six records from the same press run which were lubricated with the fractionated methyldecylsiloxane lubricant alone. On initial play, 80 percent of the records passed the 3 second carrier distress criterion, 10 percent had 20 seconds or less of carrier distress and 10 percent had over 20 seconds of carrier distress.

After a first stressing, however, all of the records had carrier distress of over 20 seconds. The same result was obtained after the second stressing.

EXAMPLE 2

A series of tests were made varying the amount of the additive of Example 1 added to the methyldecylsiloxane lubricant. The results are tabulated below.

TABLE

| % Oil | Initial Play | | | 1st Stress | | | 2nd Stress | | | 3rd Stress | | |
|---|---|---|---|---|---|---|---|---|---|---|---|---|
| | Med. | Range | #Pass | Med. | Range | #Pass | Med. | Range | #Pass | Med. | Range | #Pass |
| 1% | 8.8 | 0.1–56 | 3/6 | 13 | 2.2–1500 | 2/6 | 26 | 7.6–58 | 0/6 | 41 | 4.6–1632 | 0/6 |
| 5% | 0.9 | 0.16–52 | 4/6 | 2.1 | 0.6–20 | 4/6 | 65 | 3.8–344 | 0/6 | 14.6 | 0.7–57 | 2/6 |
| 10% | 0.8 | 0.1–32 | 4/6 | 0.8 | 0.1–32 | 4/6 | 5.4 | 1.6–656 | 3/6 | 29 | 3–102 | 2/6 |
| 20% | 0.7 | 0.24–11 | 5/6 | 0.7 | 0.24–11 | 5/6 | 19 | 2.9–342 | 2/6 | 7 | 0.5–14 | 3/6 |
| 40% | 0.6 | 0.08–19 | 5/6 | 0.6 | 0.08–19 | 5/6 | 11 | 1.0–1900 | 3/6 | 1.7 | 0.7–58 | 4/6 |
| 60% | 0.16 | 0.1–2 | 6/6 | 0.16 | 0.1–2 | 6/6 | 5.7 | 2.8–81 | 3/6 | 4.0 | 1.2–87 | 3/6 |

It is apparent that improved results are obtained at a level of about 5 percent and some improvement is noted as the level of the additive is increased, with some variations.

EXAMPLE 3

A group of video records as in Example 1 which had been lubricated with the lubricant plus the additive were compared to records from the same press run lubricated with the methyldecylsiloxane lubricant alone. The records were played once and then stressed by placing in a chamber at 40° F. for 1 hour and then transferring to a chamber at 100° F. and 95 percent relative humidity for 3 hours.

All of the doped lubricated records passed the 3 second stress test for carrier distress on initial play, 60 percent passed after 1 stressing and 40 percent passed after the 2nd and 3rd stress tests.

On the undoped lubricated records, however, only 70 percent passed the 3 second criterion on initial play and none passed after stressing up to 3 times.

EXAMPLE 4

A group of video records as in Example 1 which had been lubricated with the doped lubricant were compared to records from the same press run lubricated with an undoped lubricant. The records were played and then stressed by placing in a chamber at 110° F. for 7 days, then for 1 hour at 100° F. and 95 percent relative humidity and finally for 1 hour at ambient conditions.

All of the doped lubricated records passed the 3 second criterion for carrier distress on initial play, 80 percent passed after the 110° F. conditioning and 1st stressing and 100 percent passed after a 2nd stressing at 100° F. and 95 percent relative humidity.

For the undoped records, however, only 60 percent passed the 3 second criterion on initial play, none passed after the 110° F. conditioning, 60 percent passed after the 1st stressing and 16 percent passed after the 2nd stressing at 110° F. and 95 percent relative humidity.

EXAMPLE 5

A solution containing 0.03 percent of diisopropanol amine and 0.3 percent of a purified methyldecylsiloxane molecularly distilled at 205° C. in heptane was prepared. A group of video records as in Example 1 as pressed, and a second group which had been washed in an aqueous solution of alcohols and amines described hereinabove and dried in 1,1,2-trifluoro-2,2,1-trichloroethane, were sprayed with this solution. The lubricant film on the records was about 200–400 angstroms thick.

On initial playback, all of the records had less than 0.5 second of carrier distress.

The records were then placed in a chamber at 100° F. and 95 percent relative humidity for 1 hour and played again. All of the records had less than 0.5 second of carrier distress.

EXAMPLE 6

The procedure of Example 1 was followed except substituting as the hydroxylated amine the compound

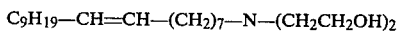

$C_9H_{19}-CH=CH-(CH_2)_7-N-(CH_2CH_2OH)_2$ available as Armostat 310 from the Armour Co.

These records were compared to a control set lubricated with the methyl alkyl siloxane fractionated lubricant alone. The results are summarized below in Table II.

TABLE II

| Carrier Distress, sec./hr. | | | |
|---|---|---|---|
| Doped Lubricant | | Control | |
| Initial | After Stress | Initial | After Stress |
| 234.+ | 56.2 | 53.8 | 475. |
| 226.+ | 230. | 7.2 | 312. |
| 0.3 | 0.2 | 10.2 | 804. |
| 0.2 | 9.0 | 147. | 1240. |
| 0.8 | 9.5 | 0.2 | 860. |
| 0.7 | 0.3 | 0.1 | 708. |

+Discs suspect

EXAMPLE 7

The procedure of Example 1 was followed except substituting as the hydroxylated amine the compound

$C_6H_{13}-CH=CH-(CH_2)_5-N-(CH_2CH_2OH)_2$ available as Armostat 410 of the Armour Co.

These records were tested and stressed as in Example 1 and compared to the control as in Example 6. The data are summarized below in Table III.

TABLE III

| Carrier Distress, secs./hr. | |
|---|---|
| Doped Lubricant | |
| Initial | Stress |
| 0.8 | 20.3 |
| 0.1 | 1.2 |
| 0.5 | 10.4 |
| 0.2 | 0.4 |
| 0.2 | 0.8 |
| 0.2 | 37.0 |

We claim:

1. In a high density information record adapted for use with a playback stylus to effect recovery of signals occupying a bandwidth of at least several megahertz when relative motion at a desired rate is established between said record and said stylus, said record comprising a disc of a conductive material containing an information track constituted by a surface relief pattern in said track to accommodate recovery of signals of said bandwidth upon establishment of relative motion at said rate, said record coated wtih a methylalkylsiloxane lubricant having the formula

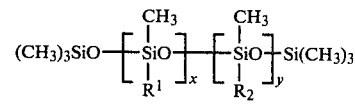

$$(CH_3)_3SiO{\left[\begin{array}{c}CH_3\\|\\SiO\\|\\R_1\end{array}\right]}_x{\left[\begin{array}{c}CH_3\\|\\SiO\\|\\R_2\end{array}\right]}_y Si(CH_3)_3$$

wherein $R_1$ and $R_2$ are alkyl groups of 4–20 carbon atoms, x is an integer of 2–4, y is an integer of 0–2 and wherein the sum of x plus y is 4 or less, the improvement which comprises adding to said lubricant an hydroxylated amine compound of the formula

$$N{\begin{array}{c}-R_3\\-R_4\\-R_5\end{array}}$$

wherein $R_3$ is hydrogen, lower alkyl or hydroxyalkyl; $R_4$ is $R_6A$ wherein $R_6$ is an alkyl group of 1–5 carbon atoms and A is hydroxyl or carboxyl; $R_5$ can be $R_7A$ wherein $R_7$ is a straight chain alkyl group of 1–10 carbon atoms and A has the meaning given above or can be $R_7A-B-R_8$ wherein $R_7$ and A have the meanings given above, B is a linking group which can be —O— or —C=C— and $R_8$ is an alkyl group of from about 6–25 carbon atoms.

2. A record according to claim 1 wherein x is 2–4 and y is 0.

3. A record according to claim 1 wherein the hydroxylated amine is a quaternary salt of the formula

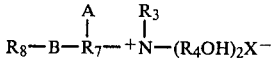

$$R_8-B-R_7-\overset{A}{\underset{|}{\overset{|}{N}}}-(R_4OH)_2 X^-$$

wherein $x^-$ can be a halogen or —$CH_3SO_4$.

4. A record according to claim 1 wherein from about 5 to about 40 percent by weight of the methylalkylsiloxane lubricant of the hydroxylated amine is present.

5. A record according to claims 1 or 4 wherein said record is made of a conductive carbon-containing polymer or copolymer of polyvinylchloride.

* * * * *